United States Patent [19]

Cohen et al.

[11] Patent Number: 4,524,301

[45] Date of Patent: Jun. 18, 1985

[54] COMPACT FLUORESCENT LAMPS

[75] Inventors: Sheppard Cohen, Danvers; Nikolaos Barakitis, Haverhill; Frederick A. Loughridge, Ipswich; Richard C. Marlor, Beverly, all of Mass.

[73] Assignee: GTE Products Corporation, Stamford, Conn.

[21] Appl. No.: 431,955

[22] Filed: Sep. 30, 1982

[51] Int. Cl.³ ...................... H01J 61/30; H01J 61/88
[52] U.S. Cl. .................................. 313/493; 313/611; 313/634
[58] Field of Search ............... 313/493, 609, 610, 611, 313/634

[56] References Cited

U.S. PATENT DOCUMENTS 4,208,618 7/1980 Heine .............................. 313/493 X

FOREIGN PATENT DOCUMENTS 57-44958 3/1982 Japan .................................. 313/493

Primary Examiner—Palmer Demeo
Assistant Examiner—Sandra L. O'Shea
Attorney, Agent, or Firm—William H. McNeill; Carlo S. Bessone

[57] ABSTRACT

A compact fluorescent lamp composed of at least four tubes having their ends hermetically sealed in receptacles. Two of the tubes have electrodes sealed therein and passages formed in the receptacle connect the other ends of the tubes to complete the arc path.

4 Claims, 6 Drawing Figures

COMPACT FLUORESCENT LAMPS

TECHNICAL FIELD

This invention relates to fluorescent lamps and more particularly to compact fluorescent lamps. Still more particularly, the invention relates to fluorescent lamps suitable as replacements for incandescent lamps.

BACKGROUND ART

The fluorescent lamp is the most widely utilized light source in the world for general illumination, primarily because of its relatively low initial cost and its efficacy: i.e., its light output relative to its power input, usually expressed as lumens per watt (LPW). Nevertheless, for home use, the fluorescent lamp has not taken precedence over the incandescent lamp. Many reasons have been advanced for this lack of acceptance, among them the poor color rendition of some fluorescent lamps and their need for a ballast. However, one of the major disadvantages lies in the fact that a fluorescent lamp is a linear light source whereas an incandescent lamp can almost be considered a point source. The typical fluorescent lamp has a length of from 18" to 8' and is somewhat cumbersome to work with.

With the increasing cost of energy, attempts have been made to overcome the latter difficulty. One of these attempts has utilized a plurality of fluorescent tubes having one or more smaller tubes connecting the ends of the fluorescent tubes to provide an arc path. Such lamps are shown in U.S. Pat. No. 3,501,662. "U" shaped lamps such as those shown in U.S. Pat. Nos. 3,602,755; and 2,401,228; and triple bend lamps such as shown in Ser. No. 126,818, exemplify other attempts.

While each of these proposals has its own advantages, disadvantages also exist. The previous forms of multiple tubing lamps are expensive to produce and difficult to handle during manufacture.

The "U" shaped lamps, when made from 4' linear tubes, still have an overall length of about 2' and are best suited for use in ceiling fixtures. When made of smaller tubing and in small sizes the light output is deficient.

The triple bend lamps necessitate extremely large investment in order to be manufactured economically and it is only possible to bend very small diameter tubes to the small radius needed for compactness.

DISCLOSURE OF THE INVENTION

It is, therefore, an object of the invention to obviate the disadvantages of the prior art.

It is another object of the invention to provide a compact fluorescent lamp.

Yet another object of the invention in the provision of a compact fluorescent lamp that is economical to fabricate.

These objects are accomplished, in one aspect of the invention, by the provision of a fluorescent lamp assembly which has a housing provided at one end with a receptacle which mounts a plurality of fluorescent tubes. At least two of the tubes have one closed end each of which carries an electrode. Open ends of the tubes are hermetically sealed to the receptacle. A passage formed in the receptacle connects the open ends and forms a continuous arc path.

Lamps constructed as above assemble efficiently and economically. The interconnecting passage provides an easily sealable arc path and the hermetic seals between the open ends and the receptacle are easily accomplished by known techniques. Further, a compact lamp is produced without encountering the problems engendered by the triple bend lamps.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
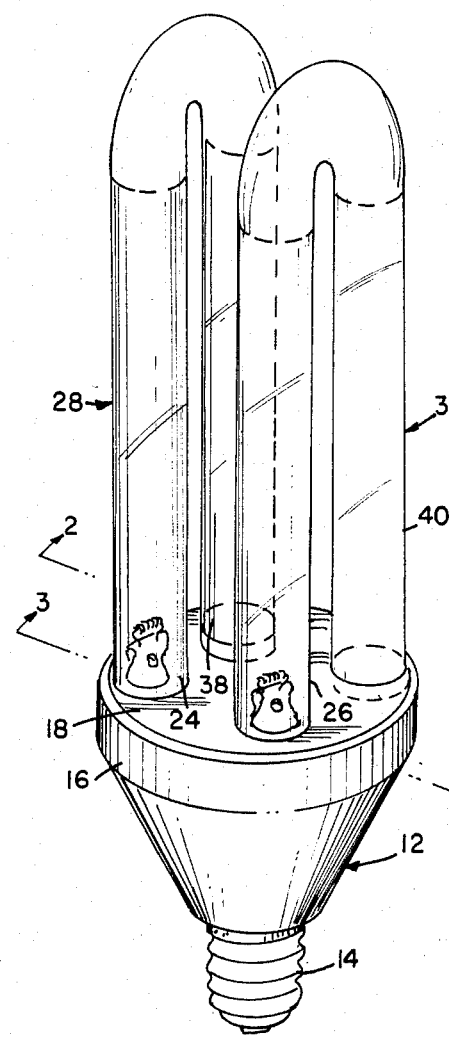
FIG. 1 is a perspective view of one embodiment of the invention.
Figure 2:
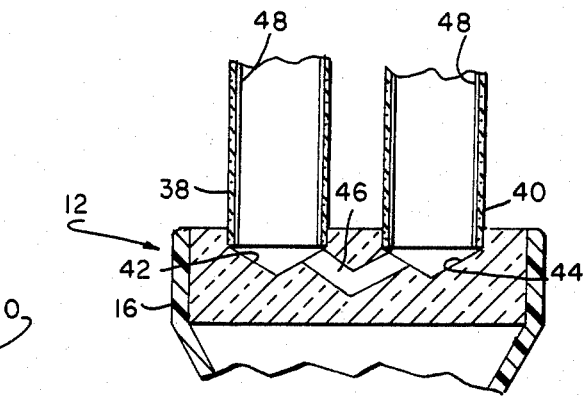
FIG. 2 is a sectional view taken along the line 2—2 of FIG. 1 and 2—2 of FIG. 4.
Figure 3:
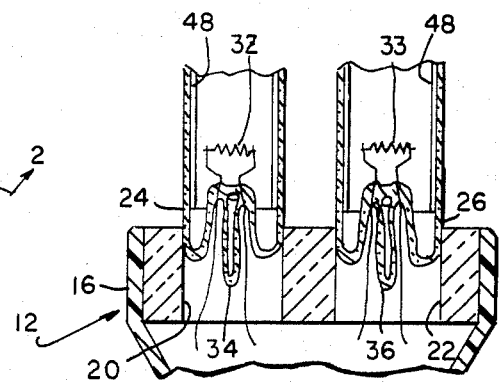
FIG. 3 is a sectional view taken along the line 3—3 of FIG. 1.

Referring now to the drawings with greater particularity, there is shown in FIG. 1 a fluorescent lamp assembly 10 having a housing 12 which terminates at one end in a base 14 which is formed for electrical coupling with a socket. Base 14 is shown as a screw or Edison type; however, any suitable type of base can be employed. The other end 16 of housing 12 is fitted with a receptacle 18 such as a receptacle which can be made of pressed glass; ceramic bodies of suitable expansion such as Fosterite; or glass sealing metals such as Sylvania #4 alloy; an alloy of 27% chromium, balance iron; or an alloy of 52% nickel, balance iron. Other materials can also be employed. Through holes 20 and 22 in receptacle 18 receive the closed ends 24 and 26 of U shaped fluorescent tubes 28 and 30. The closed ends carry electrodes 32 and 33 respectively and can be provided with exhaust tubulations 34 and 36. Each of the U shaped tubes 28 and 30 also has an open end, 38 and 40 respectively, which are received in cavities 42 and 44 formed in receptacle 18. The cavities do not extend through receptacle 18 but are interconnected via passage 46. The open ends 38 and 40 are hermetically sealed to the receptacle 18.

The U shaped tubes 28 and 30 have their interior surface coated with a suitable phosphor 48 and contain mercury and an inert gas, as is conventional.

To facilitate sealing, the receptacle 18 is preferably made from the same material as the tubes 28 and 30, such as a soda-lime glass, or one of the other materials noted above. The hermetic seal of the open ends 38 and 40 is preferably achieved by employment of a solder glass of suitable thermal expansion.

Figures 4, 5, 6:
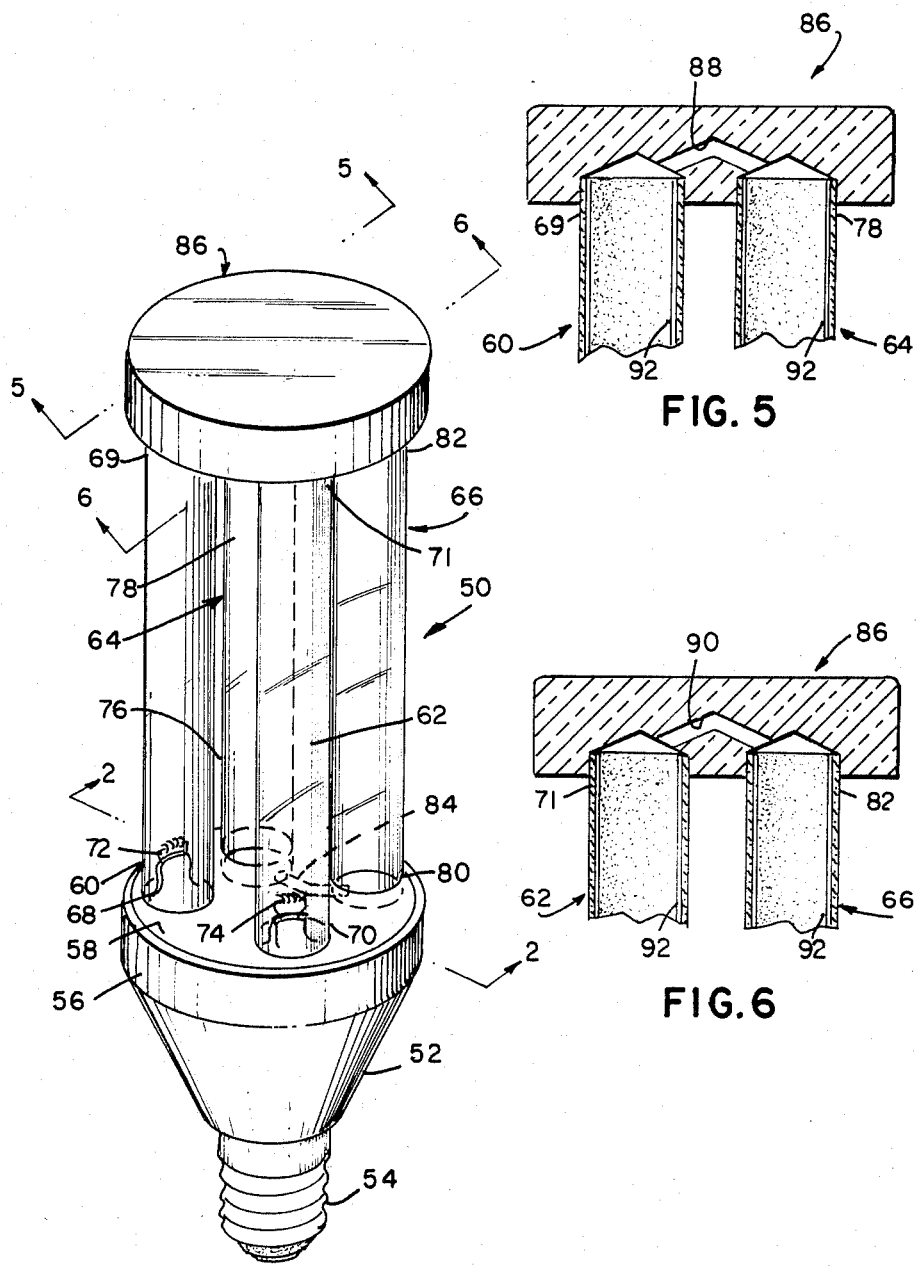
FIG. 4 is a perspective view of an alternate embodiment of the invention.
FIG. 5 is a sectional view taken along the line 5—5 of FIG. 4.
FIG. 6 is a sectional view taken along the line 6—6 of FIG. 4.

An alternate embodiment is shown in FIGS. 4, 5, and 6. Therein, a fluorescent lamp assembly 50 has a housing 52 which terminates in a base 54 formed for electrical coupling with a socket. The other end 56 of housing 52 is fitted with a first receptacle 58 which is similar to receptacle 18. At least four fluorescent tubes, 60, 62, 64, and 66 are mounted on receptacle 58 and extend therefrom. First and second of these tubes, e.g., 60 and 62, have closed ends 68 and 70 respectively, which carry electrodes 72 and 74; and open ends 69 and 71. Third tube 64 has a proximal end 76 and a distal end 78. Fourth tube 66 has a proximal end 80 and a distal end 82. The proximal ends 76 and 80 are hermetically sealed in holes in first receptacle 58 and a passage 84 formed in receptacle 58 connects them.

A second receptacle 86 is hermetically sealed to the open ends 69 and 71 of first and second tubes 60 and 62 and to the distal ends 78 and 82 of third and fourth tubes 64 and 66. A first passage 88 formed in receptacle 86 connects open end 69 and distal end 78 and a second passage 90 formed in receptacle 86 connects open end 71 and distal end 82. All of the tubes have a phosphor layer 92 on the interior surface thereof.

In a preferred embodiment a suitable ballast for lamps 10 and 50 can be contained within the housings 12 and 52, thus making the lamps self-contained and usable in typical incandescent sockets.

There is thus provided a compact fluorescent lamp that is efficient and economical and avoids the disadvantages of the prior art.

While there have been shown what are at present considered to be the preferred embodiments of the invention, it will be apparent to those skilled in the art that various changes and modifications can be made herein without departing from the scope of the invention as defined by the appended claims.

We claim:

1. A fluorescent lamp assembly comprising:
a housing terminating at one end in a base formed for electrical coupling with a socket; a receptacle fitted to the other end of said housing; a pair of U shaped fluorescent tubes mounted upon said receptacle, each of said tubes having a closed end carrying an electrode and an open end, said open ends being hermetically sealed to said receptacle; and a passage formed in said receptacle connecting said open ends.

2. The lamp assembly of claim 1 wherein said receptacle is made of glass.

3. A fluorescent lamp assembly comprising:
a housing terminating at one end in a base formed for electrical coupling with a socket; a first receptacle fitted to the other end of said housing; at least four fluorescent tubes mounted upon said receptacle and extending therefrom; first and second of said tubes each having a closed end carrying an electrode and an open end; third and fourth of said tubes having proximal and distal open ends said proximal ends being hermetically sealed to said first receptacle; a passage formed in said first receptacle connecting said proximal ends of said third and fourth tubes; a second receptacle hermetically sealed to said open ends of said first and second tubes and to said distal ends of said third and fourth tubes; a first passage formed in said second receptacle connecting said open end of said first tube and said distal end of said third tube; and a second passage formed in said second receptacle connecting said distal end of said fourth tube and said open end of said second tube.

4. The lamp assembly of claim 3 wherein said receptacles are made of glass.

* * * * *